Jan. 15, 1946.　　F. L. HAUSHALTER　　2,393,161
CUSHION TIRE
Filed July 12, 1941
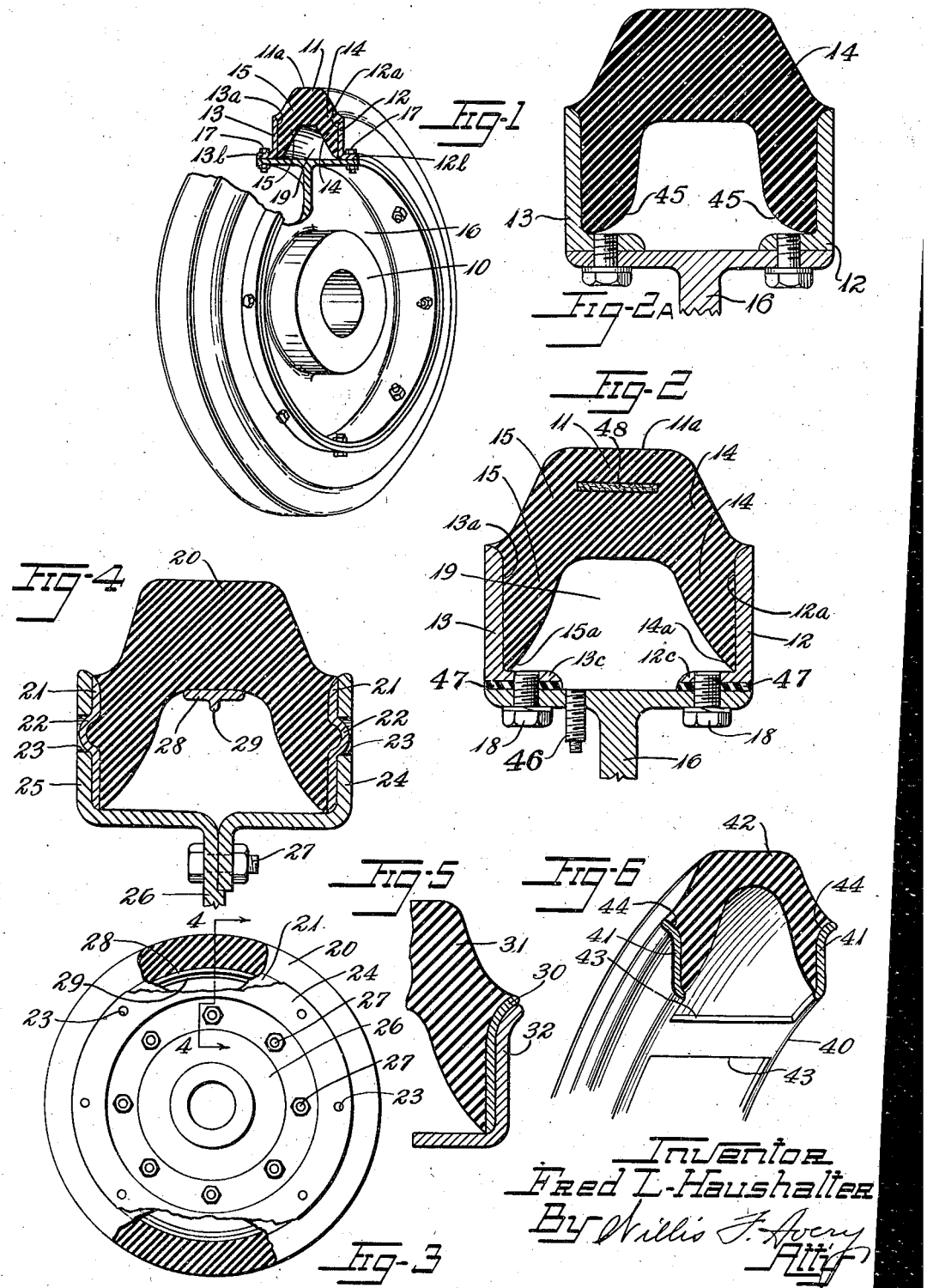
Inventor
Fred L. Haushalter
By Willis F. Avery
Atty Patented Jan. 15, 1946

2,393,161

UNITED STATES PATENT OFFICE 2,393,161

CUSHION TIRE

Fred L. Haushalter, Akron, Ohio, assignor to The B. F. Goodrich Company, New York, N. Y., a corporation of New York Application July 12, 1941, Serial No. 402,130

6 Claims. (Cl. 152—325)

This invention relates to tires and especially to cushion tires of types not requiring inflation.

Heretofore, efforts to provide a tire having a tread supported by the resilient material of the tire, rather than pneumatically, have been for the most part directed to the expedient of a structure in which the tire material has been disposed to resist deflection by compressive or bending stresses in the tire. A difficulty sometimes encountered in prior cushion tire constructions has been excessive generation of heat under flexing of the resilient tire material in compression, or in compression and bending, which objectionable heating has often resulted in early tire failure.

I have found that a reduction in the deleterious effects of heating, as well as improved cushioning, may be accomplished by providing a structure in which the forces of operating load are resisted principally or entirely by shear stress in the tire in contrast to the compression and bending stresses of prior cushion tire constructions. The quantity of heat generated per unit volume under flexing of rubber-like material mounted to resist deflection by shear stress is a small part of that of the same material in compression, thereby permitting deflection of considerable magnitude by operating under shear stress, with less heating in the rubber-like material.

The chief objects of the present invention are to provide a tire having increased life and improved cushioning; to provide for increased magnitude of deflection; to provide a tire in which the forces of the supported load are resisted by shear stress in the material of the tire; to provide a cushion tire not requiring inflation and having its tread supported substantially all by shear stress on the rubber-like material, rather than compressive or bending stresses in the tire; to provide for improved fatigue resistance of the structure; to provide for a reduction in the effects of heating, while improving cushioning; to provide for reduction of thermal-deterioration of the rubber-like material of the tire, thereby providing for greater length of service, and to provide for economy and convenience of manufacture and assembly.

These and further objects will be apparent from the following description, reference being had to the accompanying drawing in which:

Fig. 1 is a perspective view of a wheel having a tire constructed according to and embodying the invention, parts being broken away and sectioned.

Fig. 2 is a sectional view of a modified construction, on an enlarged scale.

Fig. 2a is a view similar to Fig. 2, but showing a further modified construction.

Fig. 3 is a side elevation of a further modified form of tire and wheel construction.

Fig. 4 is a section on an enlarged scale taken along the line 4—4 of Fig. 3.

Fig. 5 is a fragmentary view like Fig. 4, but showing details of a further modified construction.

Fig. 6 is a perspective view of a portion of a still further modified construction.

To the end of attaining the objects of my invention as hereinabove stated, I provide a tire construction as shown for example in the illustrative embodiments of Figs. 1 and 2 of the drawing. A wheel, indicated generally at 10, has a body 11 of resilient rubber or other rubber-like material secured as by a vulcanized bond or a suitable bonding agent, or by other suitable attaching means, to side supporting members 12 and 13 of the wheel 10 in a manner such that the sole connection between the rubber-like material 11 and the supporting members is at the inner surfaces of the members 12 and 13 at 12a and 13a which surfaces preferably extend radially of the wheel 10 and generally in the direction of forces applied to the tire under operating load so that such forces are resisted substantially all by shear stress in the rubber-like material 11 in the regions indicated generally at 14 and 15 between the tread 11a and the attachment at 12a, 13a.

The side supporting members 12 and 13 may be mounted on a torque frame 16, as for example by means of the outwardly extending flanges 12b and 13b of Fig. 1 or the inwardly extending flanges 12c and 13c of Fig. 2 suitably fixed to the torque frame as by bolts 17, 17 in Fig. 1 or 18, 18 in Fig. 2. It is desirable that the bolts or other fastening means be conveniently positioned for easy assembly operations.

The members supporting the tire are preferably mounted relatively closer together than when the rubber-like material is in its relaxed state so that the rubber-like material is initially put under compressive stress laterally of the structure.

The tire and wheel having the forces of the supported load resisted by shear stress in the rubber-like material of the tire permits relatively large deflections for improved cushioning of the shocks and jolts of impact encountered by a wheel in use, while a relatively small quantity of heat is generated per unit volume of the material by such deflections, making possible high fatigue resistance and long wear in the tire.

A hollow chamber 19 makes possible the desired clearances for the proper action in shearing stress of the rubber parts 14 and 15 of the tire, to permit extensive deflection of the tread portion of the tire. The bottom surfaces 14a, 15a of the sidewall portions may be kept well clear of the underlying metal to assure action by shearing stress of the rubber throughout all vertical movement, or these bottom surfaces may be curved into proximity with the underlying metal as indicated at 45, 45 in Fig. 2a, so that normal deflections will be taken by shearing stress of the rubber and excessive loadings will be resisted by gradually applied compressive stresses after the range of shear stresses is exceeded.

A modified cushion tire construction is shown in Figs. 3 and 4 of the drawing. As shown here a cushion tire 20, like that of Figs. 1 and 2, is suitably secured to a suitable reinforcement which may be in the form of plates 21, 21, which may have raised portions, such for example as the buttons 22, 22, which are adapted to fit into recesses 23, 23, of radially-extending side supporting members 24 and 25 of a torque frame 26. To provide a simple and economically manufactured construction, one of the side supporting members 25 may be formed integral with the torque frame, while the other member 24 is preferably removable for convenience of assembly and replacement. The member 24 may be fastened to the torque frame 26 by any suitable expedient, as by bolts 27, 27 shown in the drawing. As in the previously described embodiment, the rubber-like material is here mounted so that the forces of the supported load are resisted by shear stress in the material.

A metal ring 28 may be provided at the inner surface of the tread region to facilitate the distribution of shear stress in the tire and resist undesirable deflection of the central portion of the tread. A dependent portion 29 on the ring may be provided to insure accurate centering of the tire in a mold during construction and to reinforce the ring.

A further modified construction is shown in Fig. 5. A plate 30 on each side of the wheel, to which the resilient material of a tire 31 is secured, extends over the margins of a side supporting member 32. The material of the tire 31 extends over the surface of the portion of the plate 30 which is bent over the margins of the member 32 to provide a less severely stressed marginal termination of the bonded area thereby strengthening the bond against the possibility of tearing of the rubber-like material away from the plate surfaces. This construction further protects the joint between the plate 30 and the member 32 from forced entrance of sand or other foreign bodies.

A still further modification is shown in Fig. 6 of the drawing and comprises a unitary rim member 40 having a pair of supporting walls 41, 41 for receiving a tire 42 in a manner such that forces on the tire will be resisted by shear stress in the rubber-like material of the tire.

The tire may be extruded, molded or otherwise formed in any suitable manner to the shape desired. For effecting adhesion of the shear-stress accommodating material of the tire to the side supporting members during cure, suitable openings 43, 43 may be provided in the rim member 40 between the side supporting elements and the torque frame to permit removal of a collapsible molding core.

The supporting members may be bent outwardly at their margins, as indicated at 44, 44, so that the bond between the resilient material and the supporting plates will be less severely stressed at the margins where the tendency would otherwise be most pronounced for separation to occur.

The tire constructed in accordance with the invention is preferably formed to the general shape indicated in the drawing, but may be formed to any other suitable configuration. Improved cushioning and increased length of life are obtained as a result of mounting the rubber-like material in the manner to resist the forces of operating load principally or entirely by shear stress in the rubber-like material. The ground-contacting tread face of the tire is desirably spaced sufficiently from supporting metal parts to eliminate the possibility of contact of the metal parts with the ground even under severe deflections.

The hollow chamber within the tire structure may be open to provide for maintaining atmospheric pressure against the inside wall of the chamber to permit maximum deflection. Optionally, devices may be provided for causing a flow of air into the interior of the tire for cooling the walls thereof that are subjected to flexing. Or, the chamber may be fluid-sealing to hold air under pressure or other suitable pressure-fluid, if desired, to offer greater resistance to deflection, as for example when comparatively heavy loads are contemplated, and the structure may be suitably provided with a valve as at 46, Fig. 2, through the rim to permit the introduction of pressure-fluid into the chamber to augment the shear stress on the rubber-like material of the tire in resisting deflection. If the expedient of the multiple-part assembly is employed, sealing means such as gaskets may be provided between the joining partitions of the side supporting members, as at 47, Fig. 2, to provide a fluid-sealing chamber within the tire where such construction is desired.

While it is preferred that the cushion tire of the invention be constructed of rubber-like material for maximum deflection and good cushioning, if desired, reinforcements (48, Fig. 2), of fabric, cord, wire, or even a band of spring steel may be provided in the tread region or a tread portion of other material such as metal may be provided in the cushioning material for some purposes. It is desirable that no reinforcement be included in the portions of the cushion tire which are subjected to shearing stresses so that internal friction of the rubber-like material is kept as low as possible to further discourage the generation of heat.

Variations may be made without departing from the scope of the invention as it is defined by the following claims.

I claim:

1. A tire construction comprising a body of rubber-like material generally U-shaped in cross-section, the U-shaped body having a tread portion and sidewall portions, a pair of side supporting elements, having substantially radial inner surfaces, said sidewall portions being secured at the inner surfaces of said side supporting elements and spaced from underlying structure to transmit the supported load by shear stress in said rubber-like material, and means mounting said side supporting elements at determinate positions in spaced-apart relation with the rubber-like material between said side supporting elements maintained under lateral compression by said side supporting elements.

2. A tire construction comprising a body of rubber-like material generally U-shaped in cross-section, the U-shaped body having a tread portion and sidewall portions, a pair of side supporting elements having substantially radial inner surfaces, said sidewall portions being secured at the inner faces of said side supporting elements to transmit the supported load by shear stress in said rubber-like material, and means mounting said side supporting elements at determinate positions in spaced-apart relation with the rubber-like material between said side supporting elements maintained under lateral compression, said sidewall portions being in a cross-section of the construction tapered to points of termination at the radially inward margin of said side supporting elements in normally spaced relation with respect to said mounting means and being convexly curved therefrom at their inner faces in a manner to contact said mounting means under heavy load.

3. A tire construction comprising a body of rubber-like material generally U-shaped in cross-section, the U-shaped body having a tread portion and sidewall portions, a hollow chamber underlying said tread portion and sidewall portions, a pair of side supporting elements having substantially radial inner surfaces, said sidewall portions being secured by means of a vulcanized bond to the inner surface of said side supporting elements to transmit the supported load by shear stress in said rubber-like material, a stiffly resilient ring in said hollow chamber and secured to the rubber-like material of the inside surface of said tread portion to assist in the distribution of shear stress in the rubber-like material, and means mounting said side supporting elements at determinate positions in spaced relation such that the rubber-like material between said supporting elements is maintained under lateral compression, said sidewall portions being in a cross-section of the construction tapered to points of termination at the radially inward margins of said side supporting elements in a manner to contact said mounting means under heavy load, said side supporting elements being outwardly flared at their outermost margins and the rubber-like material overlying the outwardly flared parts to provide complete closure at such margins.

4. A resilient tire structure comprising an annular support having a base portion and a pair of annular flange portions having axially spaced-apart and opposed faces extending substantially in the radial direction from said base portion, and an annular body of resilient rubber-like material generally U-shape in cross-section between said faces and having a central tread portion disposed radially well beyond said flange portions with its inner face extensively spaced from said base portion of the supporting member to permit extensive radial deflection of the tread portion, and said body having side wall portions bonded to said faces of the flange portions and supporting said tread portion from said faces substantially entirely by shear stress of the rubber-like material, the inner faces of the side wall portions of said body extending outward from said opposed faces obliquely and steeply away from said base portion to clear the latter and merging with the inner face of said tread portion at a substantial distance from said base portion, and the contour of the outer face of said body being generally similar to the contour of the inner face thereof.

5. A resilient tire structure comprising an annular support having a base portion and a pair of annular flange portions having axially spaced-apart and opposed faces extending substantially in the radial direction from said base portion, an annular body of resilient rubber-like material generally U-shape in cross-section between said faces and having a central tread portion projecting radially well beyond said flange portions with its inner face extensively spaced from said base portion of the supporting member to permit extensive radial deflection of the tread portion, and said body portion having side wall portions bonded to said faces of the flange portions and supporting said tread portion from said faces substantially entirely by shear stress of the rubber-like material, the inner faces of the side wall portions of said body extending outward from said opposed faces obliquely and steeply away from said base portion to clear the latter and merging with the inner face of said tread portion at a substantial distance from said base portion, and the contour of the outer face of said body being generally similar to the contour of the inner face thereof, and a stiff annular member concentric with said body at the inner surface of the tread portion thereof and extensively spaced radially outward of said base portion and movable under deflection of said tread portion to distribute the load circumferentially over said tread portion to the radially outer regions of said side wall portions for effecting the cushioning action of the latter under the shear stress of their material.

6. A resilient tire structure comprising an annular support having a base portion and a pair of annular flange portions having axially spaced-apart and opposed faces extending substantially in the radial direction from said base portion, a pair of stiff flat ring members each removably seated against one of said faces, said flange portions and said ring members having cooperating recessed areas and projections seated therein in interengaged relation against relative circumferential movement, and an annular body of resilient rubber-like material generally U-shape in cross-section between said ring members and having a central tread portion projecting radially well beyond said flange portions and said ring members with its inner face extensively spaced from said base portion of the supporting member to permit extensive radial deflection of the tread portion, and said body having side wall portions bonded to the faces of said ring members and supporting said tread portion from said ring members substantially entirely by shear stress of the rubber-like material, the inner faces of the side wall portions of said body extending outward from said ring members obliquely and steeply away from said base portion to clear the latter and merging with the inner face of said tread portion at a substantial distance from said base portion, and the contour of the outer face of said body being generally similar to the contour of the inner face thereof.

FRED L. HAUSHALTER.